Patented Apr. 26, 1932

1,855,255

UNITED STATES PATENT OFFICE

FERDINAND W. NITARDY, OF BROOKLYN, NEW YORK, AND WALTER G. CHRISTIANSEN, OF BLOOMFIELD, AND RAYMOND VAN WINKLE, OF PASSAIC, NEW JERSEY, ASSIGNORS TO E. R. SQUIBB & SONS, OF NEW YORK, N. Y., A CORPORATION OF NEW YORK

MANUFACTURE OF ETHER

No Drawing. Application filed May 22, 1930. Serial No. 454,830.

This invention relates to the manufacture of ether.

It is a matter of common knowledge that ether deteriorates to form peroxides and sometimes also aldehydes, and is vitiated for anesthetic use by the presence of a small proportion of such impurities. We have found that such deterioration is due to reaction of the ether with oxygen—which it, as ordinarily manufactured, contains in solution—and that in ether free from oxygen and maintained under anaeric conditions, neither peroxides nor aldehydes develop. It has been proposed to make oxygen-free ether by distillation treatment of ordinary ether. This method, however, has proved to be unsatisfactory; probably because the heat employed therein accelerates oxidation of the ether by such air as may be present, and the peroxides thus and otherwise formed are not removed by the process.

This invention has for its object the provision of an efficient and reliable method of preparing oxygen-free ether.

Ether is generally made by heating alcohol and sulfuric acid together at about 128° C. and continuously adding alcohol as the ether formed is distilled off, in admixture with water and some alcohol. The distillate is washed with aqueous solutions in scrubbers maintained at temperatures sufficiently high to keep the ether in the vapor state, is then largely freed from water and alcohol by means of a dephlegmator, and is finally condensed.

Oxygen finds its way into this ether, we have determined, from several sources: Chief among these is the alcohol used, which ordinarily contains oxygen in solution; and the others are the apparatus, which, initially at least, is air-filled; and the scrubbing solutions and the sulfuric acid, in which, also, oxygen occurs—the former having to be replaced more or less frequently, and the latter, though theoretically unconsumed, requiring occasional replenishment of its proportion, owing to loss, for instance, as spray carried over with vapors.

We have found that oxygen-free ether can be manufactured by precluding the introduction of oxygen from these sources; that is, by causing oxygen-free materials, especially oxygen-free alcohol, to interact in an anaeric system, and scrubbing with oxygen-free substances. Of course, the subsequent packaging of the product should also be under anaeric conditions. So manufactured and packaged, ether will be dependably free from peroxides and aldehydes for an indefinite time.

To secure and maintain an anaeric system, we may displace the air from the apparatus at the outset with an inert gas and thereafter prevent access of oxygen. We may deoxygenate the sulfuric acid, the scrubbing solution, and most particularly, the alcohol by refluxing, vacuum treatment, or percolation, through adsorbents, including activated carbons of vegetable or animal origin and activated earths.

As an example, we may flood the apparatus with nitrogen, and introduce, in the required proportions, alcohol, sulfuric acid, and a scrubbing solution which have been refluxed for half an hour; and, under anaeric conditions, suitably package the ether produced.

Though all the other steps herein disclosed are desirable for the fullest attainment of our object, it is to be understood that the use of oxygen-free alcohol is the most important characteristic of our process.

Manifestly, various operations not herein specifically described, but within the scope of the appended claims, will present themselves to those skilled in the art, whereby advantage may be taken of this invention.

We claim:

1. In the manufacture of ether, the step of causing oxygen-free alcohol to react with sulfuric acid.

2. In the manufacture of ether, the step of causing oxygen-free alcohol to react with sulfuric acid in anaeric apparatus.

3. In the manufacture of ether, the step of causing oxygen-free alcohol to react with sulfuric acid in apparatus flooded with nitrogen.

4. In the manufacture of ether, the step of causing oxygen-free alcohol to react with oxygen-free sulfuric acid.

5. In the manufacture of ether, the step of causing oxygen-free alcohol to react with oxygen-free sulfuric acid in anaeric apparatus.

6. In the manufacture of ether, the step of causing oxygen-free alcohol to react with oxygen-free sulfuric acid in apparatus flooded with nitrogen.

In witness whereof we affix our signatures.

FERDINAND W. NITARDY.
WALTER G. CHRISTIANSEN.
RAYMOND VAN WINKLE.